(12) United States Patent
Shin et al.

(10) Patent No.: US 9,033,079 B2
(45) Date of Patent: May 19, 2015

(54) WHEEL ASSEMBLY OF MOBILE ROBOT

(75) Inventors: Kyung Chul Shin, Seoul (KR); Seong Ju Park, Incheon (KR); No Soo Lee, Incheon (KR)

(73) Assignee: Yujin Robot Co., Ltd., Seoul (KR)

( * ) Notice: Subject to any disclaimer, the term of this patent is extended or adjusted under 35 U.S.C. 154(b) by 0 days.

(21) Appl. No.: 14/232,248

(22) PCT Filed: Jul. 9, 2012

(86) PCT No.: PCT/KR2012/005432
§ 371 (c)(1),
(2), (4) Date: Jan. 10, 2014

(87) PCT Pub. No.: WO2013/009060
PCT Pub. Date: Jan. 17, 2013

(65) Prior Publication Data
US 2014/0145495 A1 May 29, 2014

(30) Foreign Application Priority Data
Jul. 13, 2011 (KR) ........................ 10-2011-0069563

(51) Int. Cl.
*B60K 1/00* (2006.01)
*B60K 7/00* (2006.01)
*B25J 5/00* (2006.01)
*B60K 17/04* (2006.01)

(52) U.S. Cl.
CPC ............... *B60K 7/0007* (2013.01); *B25J 5/007* (2013.01); *Y10S 901/01* (2013.01); *A47L 2201/00* (2013.01); *B60K 17/043* (2013.01); *B60K 2007/0061* (2013.01)

(58) Field of Classification Search
USPC ............. 180/9.32, 7.1, 7.4, 167, 2.1, 8.7, 9.5; 901/1, 48
See application file for complete search history.

(56) References Cited

U.S. PATENT DOCUMENTS

| | | | | |
|---|---|---|---|---|
| 6,698,313 | B2 * | 3/2004 | Gaffney et al. | 74/665 N |
| 6,712,369 | B2 * | 3/2004 | Wu | 280/5.2 |
| 7,556,111 | B2 * | 7/2009 | Oshidari | 180/65.51 |
| 7,770,677 | B2 * | 8/2010 | Takenaka | 180/65.51 |
| 7,975,790 | B2 * | 7/2011 | Kim et al. | 180/65.51 |

FOREIGN PATENT DOCUMENTS

| KR | 10-2004-0096253 A | 11/2004 |
|---|---|---|
| KR | 10-2005-0003112 A | 1/2005 |
| KR | 10-2007-0070658 A | 7/2007 |
| KR | 10-2009-0028359 A | 3/2009 |

OTHER PUBLICATIONS

International Search Report for PCT/KR2012/005432, filed Jul. 9, 2012.

* cited by examiner

*Primary Examiner* — John Walters
*Assistant Examiner* — James Triggs

(57) ABSTRACT

The present invention relates to a mobile robot, in which a wheel is mounted on a robot body in an elevatable structure.

12 Claims, 11 Drawing Sheets

WHEEL ASSEMBLY OF MOBILE ROBOT

TECHNICAL FIELD

The present invention relates to a wheel assembly of a mobile robot, and more particularly, to a wheel assembly mounted in a mobile robot in which a wheel is mounted in a structure in which the wheel is movable up and down with respect to a robot body.

BACKGROUND ART

A mobile robot refers to a robot that may run autonomously or by external control, and performs specific tasks, and there are a cleaning robot, a monitoring robot, and the like in accordance with tasks to be performed. The mobile robot generally has a function capable of autonomously performing assigned tasks, for example, cleaning work or monitoring work.

When describing a cleaning mobile robot as an example, the cleaning mobile robot autonomously moves in a predetermined cleaning zone such as a house or an office, and sucks dust or foreign substances. To this end, in addition to a configuration of a general vacuum cleaner that sucks dust or foreign substances, the mobile robot includes a wheel assembly which allows a robot to run, a plurality of sensing sensors which senses obstacles so that the robot may run without colliding with various obstacles in the cleaning zone, a battery which supplies electric power, a microprocessor which controls the entire apparatus, and the like.

The wheel assembly, which allows the mobile robot to run, includes a wheel, and a power source such as a driving motor that provides driving power to the wheel. The wheel is rotated by driving power provided from the power source such that the mobile robot may move. However, the wheel is generally configured to be rotated in a fixed state with respect to a robot body of the mobile robot. However, the mobile robot does not run only on a flat running surface, but may run on a non-uniform running surface such as an uneven running surface, may pass over an obstacle such as a threshold, and may run on a slippery running surface.

When the mobile robot runs on an uneven running surface, because of the non-uniform running surface, only the wheel positioned at one side comes into contact with the running surface, but the wheel positioned at the other side is positioned at a concavely depressed region, and is not in contact with the running surface, and as a result, the mobile robot is continuously rotated at the same position about an axis that is defined by the wheel that is not in contact with the running surface. That is, there is a problem in that the mobile robot does not move forward, but is continuously rotated at one position.

In addition, in a case in which the mobile robot passes over an obstacle such as a threshold, when a height of the obstacle is greater than a height by which the wheel protrudes from the robot body, the wheel does not come into contact with the running surface, and thereby, a lower end of the robot body is caught by the obstacle such that the mobile robot may not move forward or rearward.

In addition, contact force of the wheel is decreased at a slippery running surface having a small frictional force because frictional force, which acts between the running surface and the wheel, is small, and thereby, there are problems in that loss of driving power may occur, and the mobile robot may not run in an intended direction.

In addition, since the wheel is mounted in a fixed state with respect to the robot body, impact or vibration, which occurs at the wheel from the running surface when the mobile robot runs while passing over an obstacle such as a threshold, or runs on an uneven running surface, is transmitted as it is to the robot body. Components such as sensors, which are sensitive to impact, are mounted in the mobile robot, and the sensors and the like may be abnormally operated due to vibration transmitted from the wheel, such that malfunction of the mobile robot may occur, and an operation of the mobile robot may stop in a serious case.

In addition, there is a need for the wheel assembly of the mobile robot that may be easily assembled when the wheel assembly of the mobile robot is assembled to the robot body of the mobile robot.

DISCLOSURE

Technical Problem

The present invention has been made in an effort to resolve the aforementioned problems in the related art, and an object of the present invention is to provide a wheel assembly of a mobile robot in which all wheels may be maintained in a contact state with a running surface when the mobile robot passes over a non-uniform running surface or an obstacle such as a threshold.

In addition, an object of the present invention is to provide a wheel assembly of a mobile robot which may smoothly run on a non-uniform or slippery running surface without loss of driving power, and may smoothly pass over an obstacle such as a threshold.

In addition, an object of the present invention is to provide a wheel assembly of a mobile robot which may attenuate impact or vibration transmitted from a wheel to a robot body when the mobile robot passes over an obstacle such as a threshold, or runs on an uneven running surface.

In addition, an object of the present invention is to provide a wheel assembly of a mobile robot which may be easily mounted on a robot body of the mobile robot.

Technical Solution

In order to resolve the aforementioned problems, the present invention provides a wheel assembly of a mobile robot, including: a gear box which accommodates a driving gear driven by a driving motor and a driven gear driven by the driving gear, is installed to be rotatable about a rotation shaft, which is provided at one side of the gear box, in front and rear directions with respect to a robot body, and has a first fixing part; a wheel which is coupled to a rotary shaft of the driven gear so as to be rotated integrally with the driven gear, and moved up or down with respect to the robot body when the gear box is rotated; and a pulling member which has one end fixed to the first fixing part, and the other end fixed to a second fixing part a position of which is fixed with respect to the robot body, and pulls the first fixing part toward the second fixing part side so as to rotate the gear box in a direction in which the wheel is moved down with respect to the robot body.

The pulling member may be a coil spring or a flat spring.

It is preferable that at least a part of an outer circumferential surface of the rotation shaft is circular, and the rotation shaft is seated and supported on a rotation shaft seating portion having a shape that matches a shape of the outer circumferential surface of the rotation shaft. In this case, it is preferable that the wheel assembly of the mobile robot further includes a lower case which accommodates at least a part of the gear box, and at least a part of the wheel, has an opened upper portion, and an opened portion of a lower surface where a route through which the wheel is moved up and down exists, and is coupled and fixed to the robot body, in which the rotation shaft seating portion is provided at the lower case, and the second fixing part is provided at the lower case. Furthermore, it is preferable that the wheel assembly of the mobile robot further includes an upper case which is coupled to an upper portion of the lower case, and forms an accommodating space which accommodates at least a part of the gear box and at least a part of the wheel. Here, it is preferable that the upper case includes a rotation shaft cover which is provided at an opposite side to the rotation shaft seating portion with the rotation shaft interposed therebetween so as to prevent the rotation shaft from being moved away from the rotation shaft seating portion.

The rotation shaft may be hinge-coupled, and in this case, the wheel assembly of the mobile robot may further include a lower case which accommodates at least a part of the gear box, and at least a part of the wheel, has an opened upper portion, and an opened portion of a lower surface where a route through which the wheel is moved up and down exists, and is coupled and fixed to the robot body, and the rotation shaft may be hinge-coupled to the lower case.

Meanwhile, it is preferable that a protruding portion, which is extended in a lateral direction, is provided on the gear box, and the wheel assembly of the mobile robot further includes a sensor which is a contact sensor and comes into contact with the protruding portion. It is preferable that the sensor is a micro switch, and is inserted into a sensor fixing part that is provided at the lower case.

Advantageous Effects

According to the exemplary embodiment of the present invention, a structure in which the wheel is movable up and down with respect to the robot body is provided, and the wheel is configured to be pressed against the running surface side by elastic force of an elastic member such that all wheels may be maintained in a contact state with the running surface when the mobile robot passes over a non-uniform running surface or an obstacle such as a threshold, and contact force is improved such that the mobile robot may smoothly run on a non-uniform or slippery running surface without loss of driving power, and may smoothly pass over an obstacle such as a threshold.

In addition, according to the exemplary embodiment of the present invention, the wheel is inserted into the robot body when impact is applied to the wheel, and the pulling member acts as resistance when the wheel is inserted into the robot body such that impact occurring at the wheel is attenuated, thereby preventing damage and malfunction of various types of components that are mounted in the mobile robot.

In addition, according to the exemplary embodiment of the present invention, the wheel assembly of the mobile robot is configured as a single module, thereby easily mounting the wheel assembly on the robot body of the mobile robot.

BEST MODE

Figure 1:
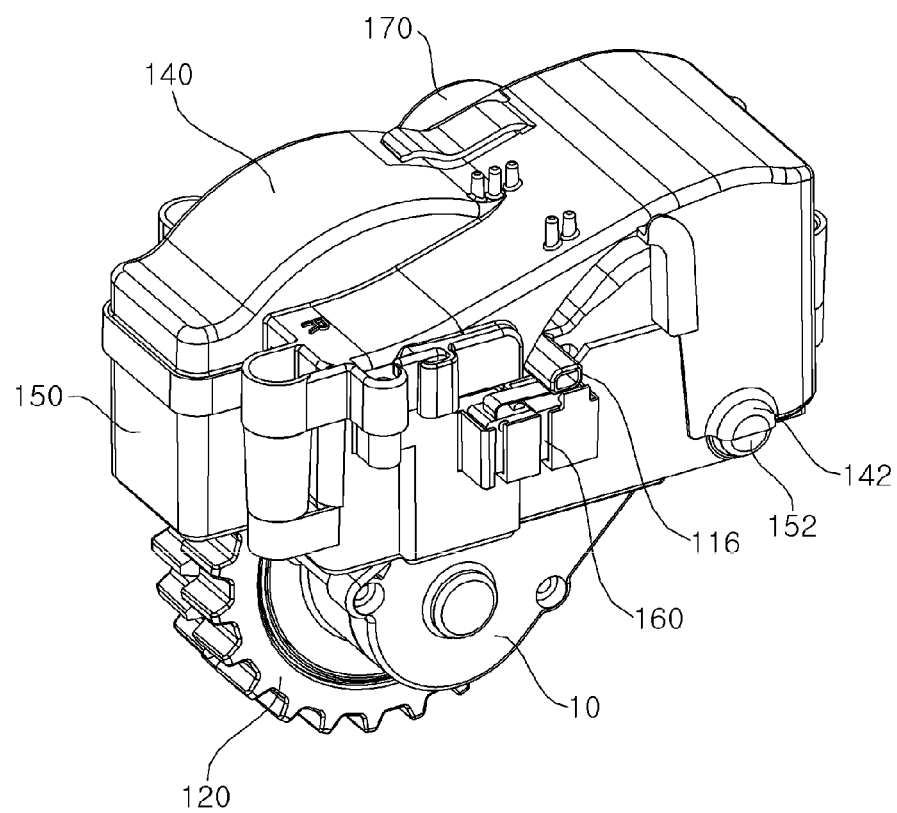
FIG. 1 is a perspective view of a wheel assembly of a mobile robot according to an exemplary embodiment of the present invention.

Hereinafter, an exemplary embodiment of the present invention will be described in detail with reference to the accompanying drawings. First, when reference numerals refer to components of each drawing, it is noted that although the same components are illustrated in different drawings, the same components are referred to by the same reference numerals as possible. In addition, in the description of the present invention, the detailed descriptions of known related constitutions or functions thereof may be omitted if they make the gist of the present invention unclear.

Figure 2:
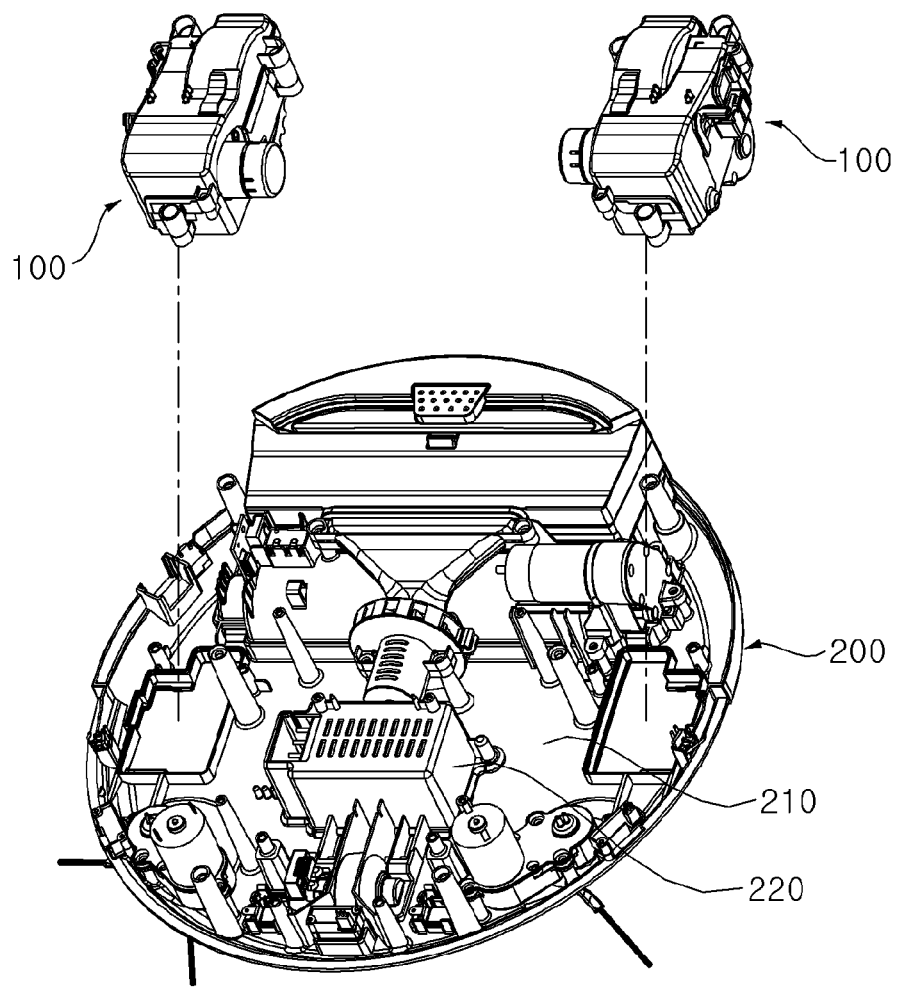
FIG. 2 is an exploded perspective view illustrating an example in which the wheel assembly of the mobile robot according to the exemplary embodiment of the present invention is coupled to a robot body of the mobile robot.
Figure 3:
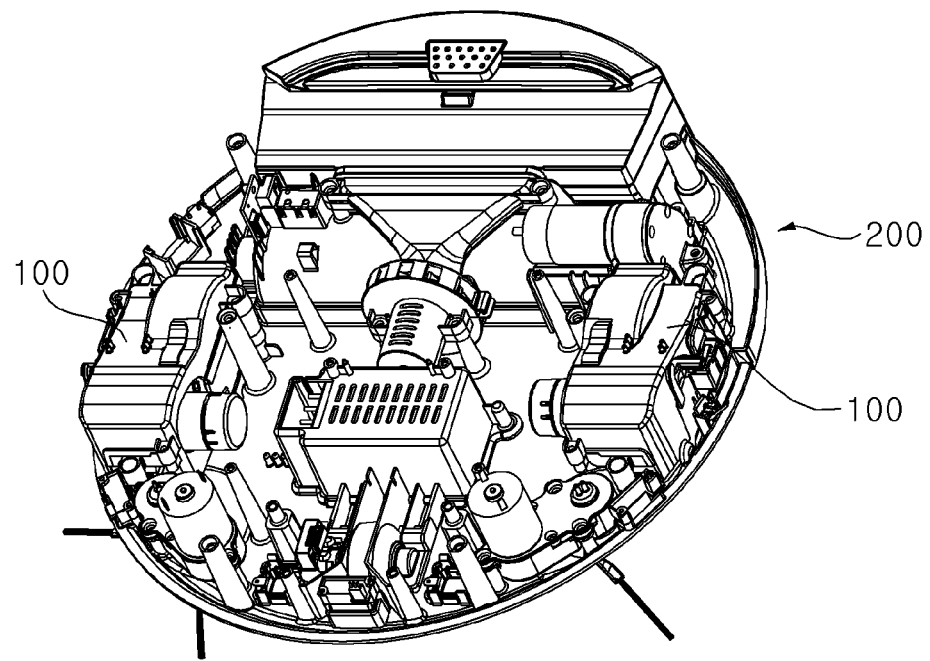
FIG. 3 is a perspective view illustrating an example in which the wheel assembly of the mobile robot according to the exemplary embodiment of the present invention is coupled to the robot body of the mobile robot.
Figure 4:
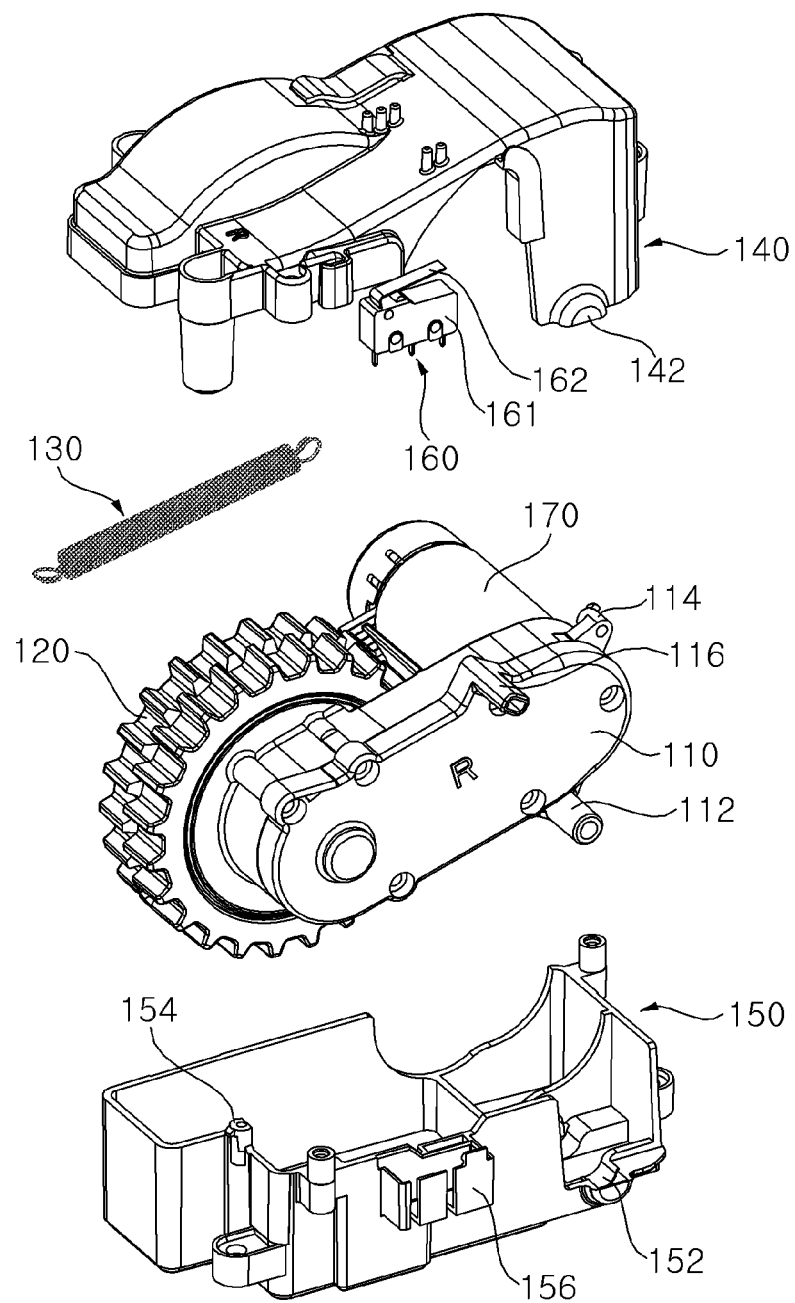
FIG. 4 is an exploded perspective view when the wheel assembly of the mobile robot according to the exemplary embodiment of the present invention is viewed in one direction.
Figure 5:
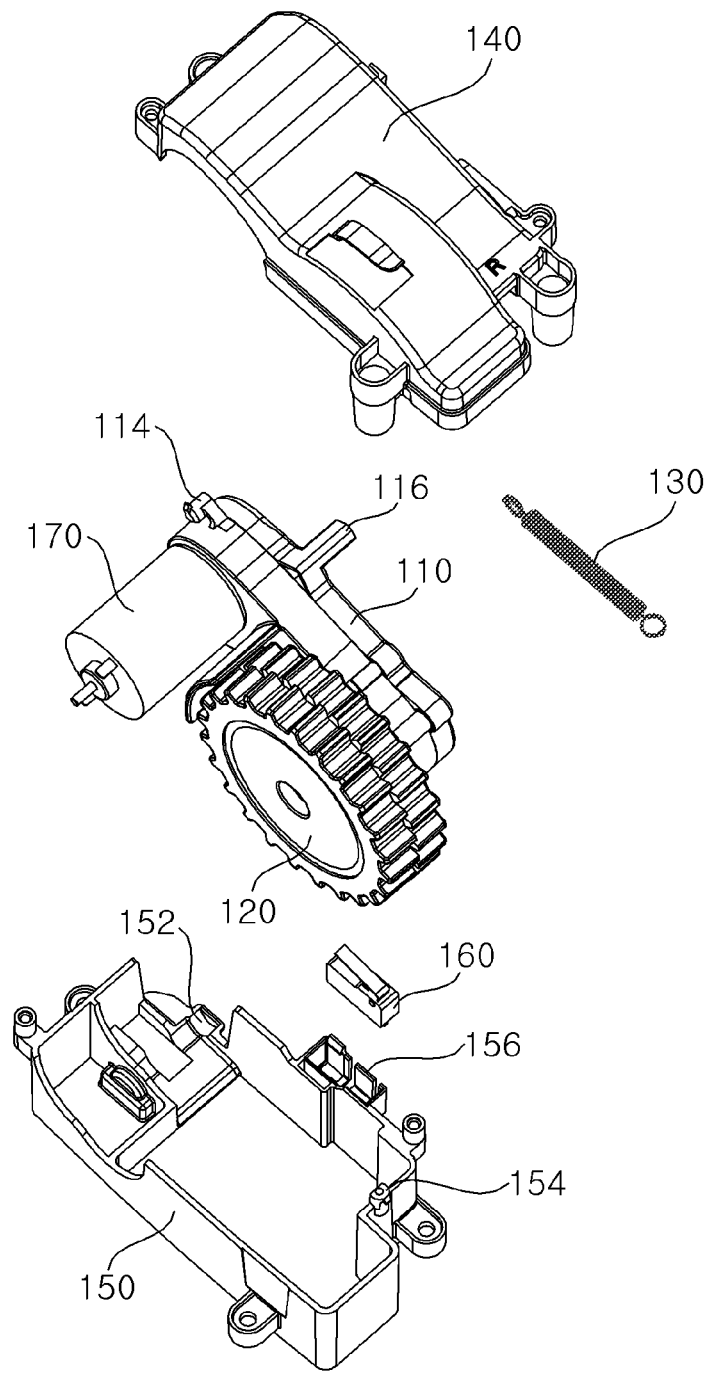
FIG. 5 is an exploded perspective view when the wheel assembly of FIG. 4 is viewed in another direction.
Figure 6:
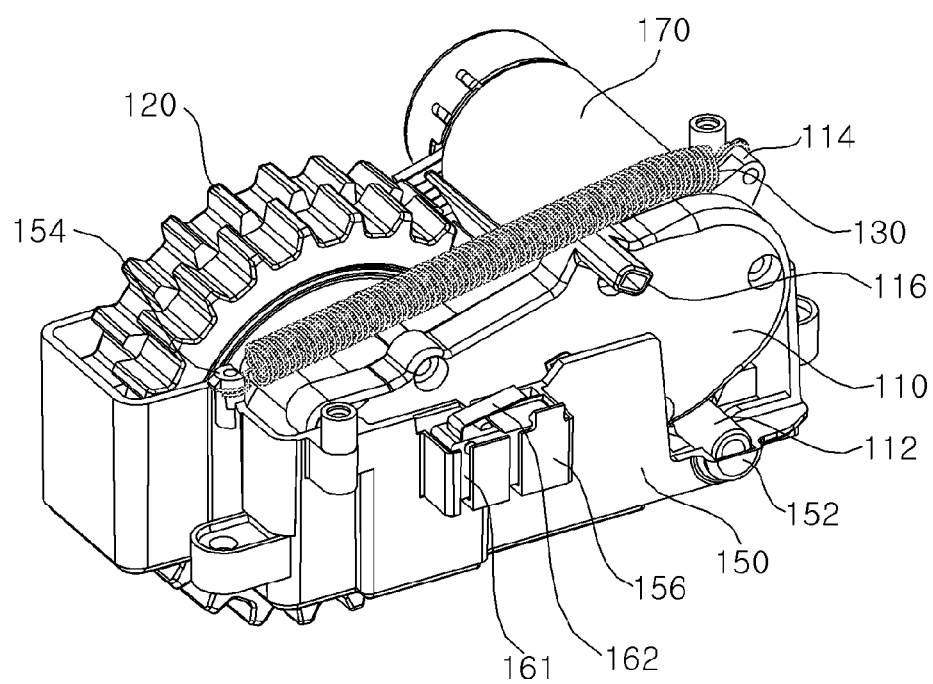
FIG. 6 is a perspective view illustrating a state in which a wheel of the wheel assembly of the mobile robot according to the exemplary embodiment of the present invention is moved up.
Figure 7:
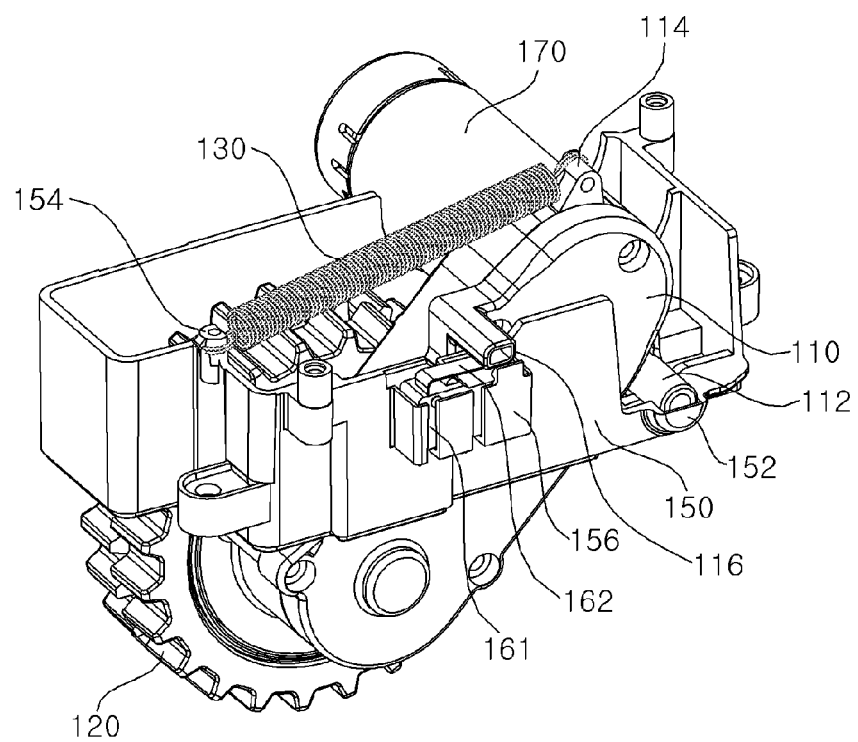
FIG. 7 is a perspective view illustrating a state in which the wheel of the wheel assembly of the mobile robot according to the exemplary embodiment of the present invention is moved down.
Figure 8:
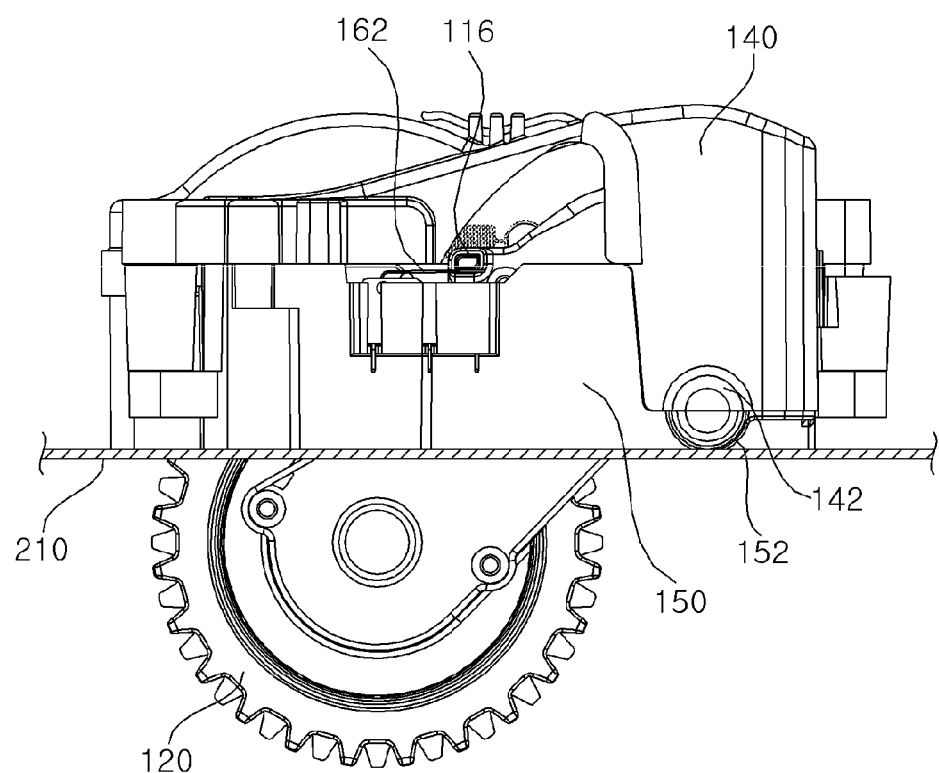
FIG. 8 is a side view illustrating a state in which the wheel of the wheel assembly of the mobile robot according to the exemplary embodiment of the present invention is moved up.
Figure 9:
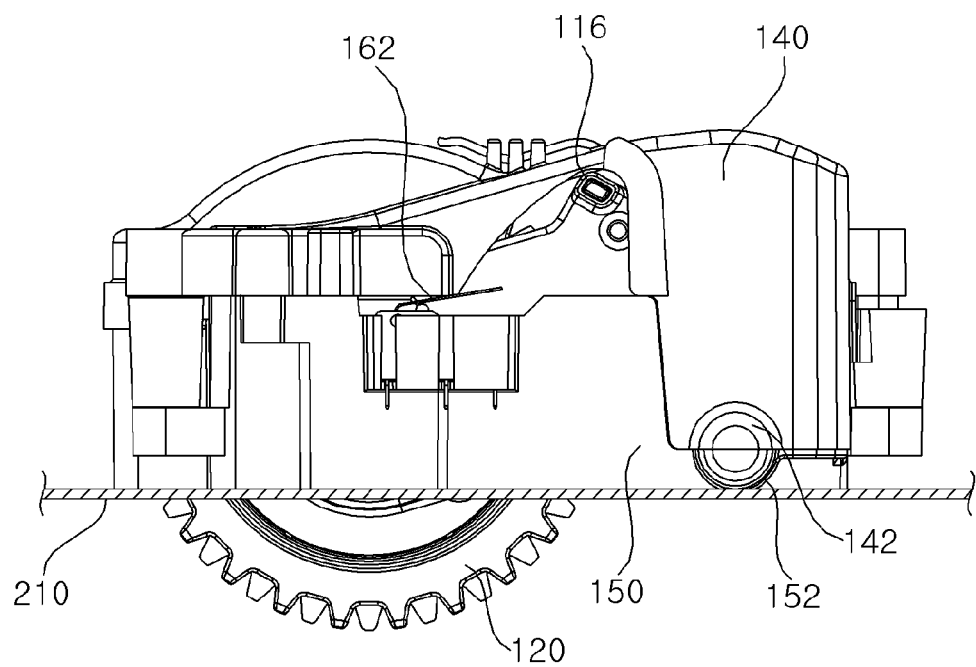
FIG. 9 is a side view illustrating a state in which the wheel of the wheel assembly of the mobile robot according to the exemplary embodiment of the present invention is moved down.
Figure 10:
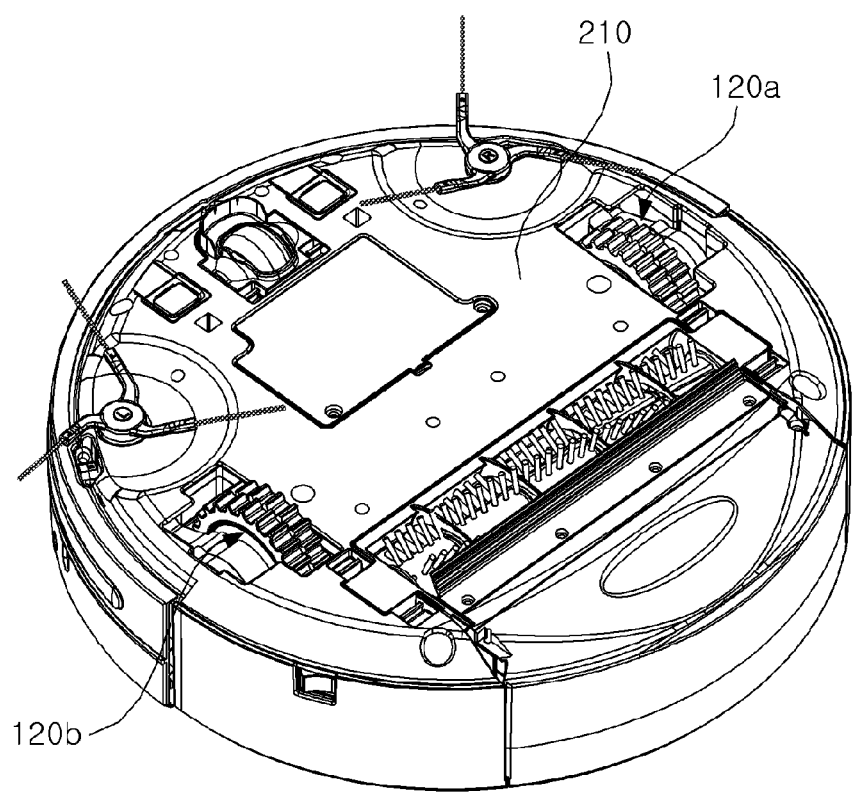
FIG. 10 is a perspective view illustrating a bottom portion of the mobile robot where the wheel assembly of the mobile robot according to the exemplary embodiment of the present invention is mounted.
Figure 11A:
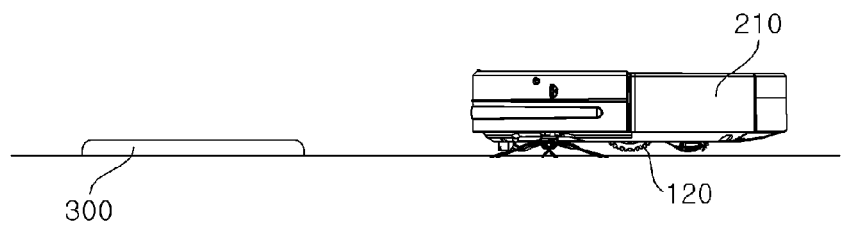
FIG. 11A to 11C are views sequentially illustrating an example in which the mobile robot having the wheel assembly of the mobile robot according to the exemplary embodiment of the present invention passes over a threshold.
Figure 11B:
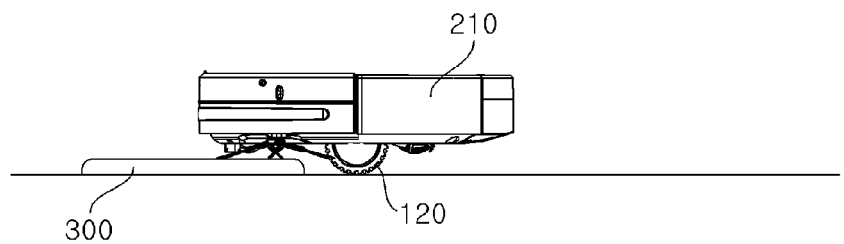
Figure 11C:
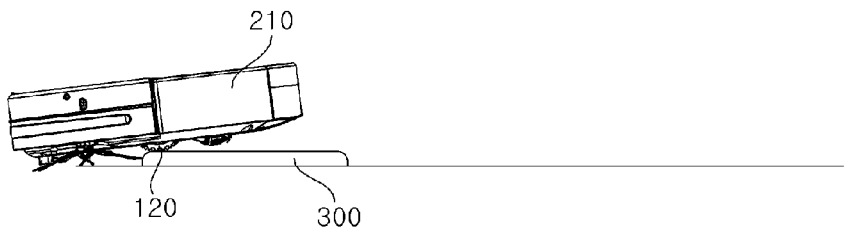

FIG. 1 is a perspective view of a wheel assembly of a mobile robot according to an exemplary embodiment of the present invention, FIG. 2 is an exploded perspective view illustrating an example in which the wheel assembly of the mobile robot according to the exemplary embodiment of the present invention is coupled to a robot body of the mobile robot, and FIG. 3 is a perspective view illustrating an example in which the wheel assembly of the mobile robot according to the exemplary embodiment of the present invention is coupled to the robot body of the mobile robot. Further, FIG. 4 is an exploded perspective view when the wheel assembly of the mobile robot according to the exemplary embodiment of the present invention is viewed in one direction, and FIG. 5 is an exploded perspective view when the wheel assembly of FIG. 4 is viewed in another direction. Further, FIG. 6 is a perspective view illustrating a state in which a wheel of the wheel assembly of the mobile robot according to the exemplary embodiment of the present invention is moved up, and FIG. 7 is a perspective view illustrating a state in which the wheel of the wheel assembly of the mobile robot according to the exemplary embodiment of the present invention is moved down. Further, FIG. 8 is a side view illustrating a state in which a wheel of the wheel assembly of the mobile robot according to the exemplary embodiment of the present invention is moved up such that the wheel is maximally inserted into the robot body, and FIG. 9 is a side view illustrating a state in which the wheel of the wheel assembly of the mobile robot according to the exemplary embodiment of the present invention is moved down such that the wheel is maximally withdrawn from the robot body. Further, FIG. 10 is a perspective view illustrating a bottom portion of the mobile robot where the wheel assembly of the mobile robot according to the exemplary embodiment of the present invention is mounted, and FIG. 11A to 11C are views sequentially illustrating an example in which the mobile robot having the wheel assembly of the mobile robot according to the exemplary embodiment of the present invention passes over a threshold.

The wheel assembly of the mobile robot according to the present invention (hereinafter, simply referred to as 'wheel assembly') may be operated after being installed in various mobile robots that run autonomously or by the external control, and perform specific tasks. Hereinafter, a configuration in which the wheel assembly of the mobile robot according to the present invention is installed in a cleaning mobile robot will be described as an example.

A robot body 200 forms an external appearance of a mobile robot, and has a plane shape that is approximately circular. A battery 220 which supplies electric power, a control unit (not illustrated) such as a microprocessor which controls the entire apparatus, and the like are installed on the robot body 200.

A wheel assembly 100 of the mobile robot according to the exemplary embodiment of the present invention is installed on a bottom surface of the robot body 200, and particularly, at least two wheel assemblies 100 are installed symmetrically on the basis of a center of the robot body 200. According to the wheel assemblies 100 of the mobile robot, wheels 120 are rotated in a forward or reverse direction by being supplied with electric power from the battery 220 so as to allow the mobile robot to run in the respective directions including front and rear directions. In this case, the respective wheels 120 may be independently driven by control of the control unit.

The wheel assembly 100 of the mobile robot according to the exemplary embodiment of the present invention includes a gear box 110, the wheel 120, a pulling member 130, an upper case 140, a lower case 150, and a sensor 160. The gear box 110 is installed to be rotatable about a rotation shaft 112, which is provided at one side of the gear box 110, in the front and rear directions with respect to the robot body 200, and has a first fixing part 114. The wheel 120 is configured to be coupled to the gear box 110 so as to be moved up or down with respect to the robot body 200 when the gear box 110 is rotated. The pulling member 130 has one end fixed to the first fixing part 114, and the other end fixed to the second fixing part 154, and pulls the first fixing part 114 toward the second fixing part 154 side so as to rotate the gear box 110. The upper case 140 and the lower case 150 are coupled to each other, and the lower case 150 is coupled to the robot body 200 such that the wheel assembly 100 is coupled to the robot body 200. The sensor 160 senses a state in which the gear box 110 is maximally rotated.

Reduction gears including a driving gear (not illustrated), and a driven gear (not illustrated) are accommodated in the gear box 110. The driving gear is coupled to a rotary shaft of a driving motor 170 so as to be driven by the driving motor 170, and the wheel 120 is coupled to a rotary shaft of the driven gear. A transmission gear (not illustrated), which transmits driving power of the driving gear to the driven gear, may be further provided between the driving gear and the driven gear. The reduction gears having the aforementioned configuration transmit driving power of the driving motor 170 to the wheel 120. In the present exemplary embodiment, a structure in which the driving motor 170, which provides driving power for driving the wheel 120, is accommodated between the upper case 140 and the lower case 150 so as to be modularized integrally with the wheel assembly 100 in order to modularize the wheel assembly 100 is illustrated, but the driving motor 170 is not an essential constituent element of the wheel assembly according to the present invention, and a position where the driving motor 170 is installed, and a structure in which the driving motor 170 is coupled to the wheel assembly 100 may be variously changed as long as a structure may be provided to couple the driving gear to the driving shaft of the driving motor 170.

The rotation shaft 112 is provided on an outer circumferential surface of the gear box 110, and formed integrally with the gear box 110. The rotation shaft 112 serves as a shaft in order to rotate the gear box 110 in the front and rear directions of the robot body 200. The gear box 110 is rotatably supported on the robot body 200 by the rotation shaft 112, and rotated about the rotation shaft 112 within a range of a predetermined angle. In the present exemplary embodiment, at least a part of an outer circumferential surface of the rotation shaft 112 is circular, and the rotation shaft 112 is rotatably seated on a rotation shaft seating portion 152 of the lower case 150 which will be described below. However, an installation structure and an installation position of the rotation shaft 112 are not limited thereto, and the rotation shaft 112 may be installed at various positions and with various structures in which the position of the rotation shaft 112 may be fixed with respect to the robot body 200, and the gear box 110 may be supported to be rotatable in the front and rear directions of the robot body 200. For example, the rotation shaft 112 may be hinge-coupled to the lower case 150, and the rotation shaft 112 may be rotatably seated on or rotatably hinge-coupled to a predetermined position of the robot body 200 instead of the lower case 150. However, in a case in which the rotation shaft 112 is configured to be seated and supported on the rotation shaft seating portion 152 like the present exemplary embodiment, when the wheel assembly 100 is assembled, the wheel assembly 100 is completed just by fixing the pulling member 130 in a state in which the gear box 110 to which the wheel 120 is attached is placed on the lower case 150, and coupling the upper case 140 to the lower case 150, and thereby, there is an effect in that assembly of the wheel assembly 100 becomes convenient.

A protruding portion 116 is formed to protrude at a predetermined distance in a lateral direction of the gear box 110, and rotated integrally with the gear box 110 when the gear box 110 is rotated. The protruding portion 116 is configured to come into contact with the sensor 160, which will be described below, in a state in which the gear box 110 is rotated and the wheel 120 is maximally moved down with respect to the robot body 200.

The wheel 120 is coupled to the rotary shaft of the driven gear so as to be rotated integrally with the driven gear, comes into contact with a running surface of the mobile robot when the wheel assembly 100 is mounted on the robot body 200, and is driven by the driving motor 170 so as to allow the mobile robot to run. The wheel 120 is fixed to the gear box 110 so as to be moved together with the gear box 110 when the gear box 110 is rotated. Therefore, when the gear box 110 is rotated, the wheel 120 also rotates about the rotation shaft 112 in the front or rear direction of the robot body 200. The wheel 120 is moved down or up as the wheel 120 rotates about the rotation shaft 112 such that the wheel 120 is withdrawn from a bottom surface 210 of the robot body 200, or inserted into the robot body 200.

The pulling member 130 has one end fixed to the first fixing part 114, and the other end fixed to the second fixing part 154 a position of which is fixed with respect to the robot body 200. The pulling member 130 has both ends fixed to the first fixing part 114 and the second fixing part 154, and serves to pull the first fixing part 114 toward the second fixing part 154 side by applying elastic force. That is to say, when one end of the pulling member 130 is fixed to the first fixing part 114 of the gear box 110, and the other end of the pulling member 130 is fixed to the second fixing part 154, the first fixing part 114 and the second fixing part 154 are connected to each other by the pulling member 130. Elastic force is applied to the first fixing part 114 and the second fixing part 154 by the pulling member 130 in opposite directions. In this case, since the second fixing part 154 is in a fixed state with respect to the robot body 200, the first fixing part 114 is pulled toward the second fixing part 154 side by elastic force of the pulling member 130. In the present exemplary embodiment, the first fixing part 114 is formed to protrude at one side of the gear box 110, and the second fixing part 154 is formed to protrude at one side of the lower case 150, which will be described below, so that the other end of the pulling member 130 may be fixed to the second fixing part 154. The gear box 110 is rotated about the rotation shaft 112 by moment that occurs when the first fixing part 114 is pulled toward the second fixing part 154 side by the pulling member 130. In this case, the position where the first fixing part 114 is formed is not limited as long as the gear box 110 is configured to be rotated in a direction in which the wheel 120 is moved down when the gear box 110 is rotated as the first fixing part 114 is pulled toward the second fixing part 154 side by the pulling member 130.

The pulling member 130 may be a coil spring as illustrated in the present exemplary embodiment. It is preferable that a length of the coil spring is adjusted so that elastic force occurs at the coil spring even when a distance between the first fixing part 114 and the second fixing part 154 is shortest in a state in which both the ends of the coil spring are caught by the first fixing part 114 and the second fixing part 154, respectively. Meanwhile, although not illustrated in the present exemplary embodiment, the pulling member 130 may be a flat spring that has a structure in which both ends thereof may be caught by the first fixing part 114 and the second fixing part 154, respectively. In addition, the pulling member 130 may be configured by various materials and structures in which both ends thereof are fixed to the first fixing part 114 and the second fixing part 154, respectively, so as to apply elastic force.

The upper case 140 and the lower case 150 are coupled to each other so as to form a predetermined accommodating space, and enclose the driving motor 170, the gear box 110, and the wheel 120, which are accommodated in the accommodating space. At least a part of the gear box 110, at least a part of the driving motor 170, and at least a part of the wheel 120 are accommodated in the accommodating space.

A lower side of the upper case 140 is opened, and the upper case 140 is coupled to an upper portion of the lower case 150. A rotation shaft cover 142 is provided at the upper case 140. An upper side of the lower case 150 is opened, and the lower case 150 is coupled to a lower portion of the upper case 140. The rotation shaft seating portion 152 on which the rotation shaft 112 is seated, the second fixing part 154 to which the other end of the pulling member 130 is fixed, and a sensor fixing part 156 to which the sensor 160 is fixed are provided at the lower case 150. For example, the upper case 140 and the lower case 150 may be coupled by a bolt that penetrates any one of the upper case 140 and the lower case 150 and is fastened to the other. The accommodating space, which is formed by coupling the upper case 140 and the lower case 150, may be formed to have a sufficient size so that the gear box 110 may be rotated in the front and rear directions of the robot body 200. When the gear box 110 is rotated in the front or rear direction of the robot body 200, the wheel 120 is moved up or down such that a part of the wheel 120 is inserted into or withdrawn from the accommodating space. In order to insert and withdraw the wheel 120, a portion of a lower surface of the lower case 150 where a route through which the wheel 120 is moved up and down exists is opened. The wheel 120 may be inserted into or withdrawn from the accommodating space of the lower case 150 through the opened portion of the lower case 150.

The upper case 140 and the lower case 150 are not essential constituent elements of the wheel assembly of the mobile robot according to the present invention, but since the upper case 140 and the lower case 150 are provided, the wheel assembly 100 may be modularized and simply mounted on the robot body 200. That is, the wheel assembly 100 may be provided as a single module by coupling the upper case 140 and the lower case 150 in a state in which the driving motor 170, the gear box 110, and the wheel 120 are accommodated in the accommodating space of the upper case 140 and the lower case 150, and the wheel assembly 100 may be mounted on the robot body 200 just by coupling the module to a mounting region of the robot body 200.

The rotation shaft seating portion 152 is provided at one side of the lower case 150, and supports the rotation shaft 112 that is seated on the rotation shaft seating portion 152. It is preferable that an inner circumferential surface of the rotation shaft 112 is formed in a shape that matches a shape of the outer circumferential surface of the rotation shaft 112. In addition, the rotation shaft cover 142 is provided at an opposite side to the rotation shaft seating portion 152 with the rotation shaft 112 interposed therebetween. The rotation shaft cover 142 covers an upper surface of the rotation shaft 112, and the outer circumferential surface of the rotation shaft 112, which is not enclosed by the rotation shaft seating portion 152, so as to prevent the rotation shaft 112 from being moved away from the rotation shaft seating portion 152. In a case in which the lower case 150 is not provided in the wheel assembly 100, a rotation shaft seating portion may be formed at a predetermined position of the robot body 200.

The sensor 160 senses a state in which the wheel is maximally moved down with respect to the robot body 200, that is, a state in which the wheel is maximally withdrawn from the bottom surface 210 of the robot body 200. When the sensor 160 senses the state in which the wheel 120 is maximally withdrawn for a predetermined time or more, the control unit determines that the mobile robot may not be operated, and cuts off electric power supplied to the driving motor 170 so as to stop an operation of the driving motor 170. For example, the state in which the mobile robot may not be operated may be a state in which the mobile robot is gripped and moved up by a user, or a state in which the mobile robot is caught by a high projection over which the mobile robot may not pass.

The sensor 160 may be a contact sensor or a non-contact sensor, and in the case of the present exemplary embodiment, the sensor 160 is implemented as a contact sensor such as a micro switch that senses an object when the object comes into contact with a contact portion. The sensor 160 may include a sensor body 161, and a contact portion 162 which may come into contact with the sensor body 161 when an object comes into contact with the contact portion 162, and may move away from the sensor body 161 while being elastically deformed when the contact portion 162 is released from the contact with the object. The sensor 160 is inserted into and fixed to the sensor fixing part 156 so that the contact portion 162 is placed on a movement route of the protruding portion 116. When the protruding portion 116 comes into contact with the contact portion 162 of the sensor 160, the sensor 160 senses the protruding portion 116, and the control unit, which receives a signal from the sensor 160, determines that the wheel 120 is positioned to be maximally moved down with respect to the robot body 200.

The feature of the wheel assembly 100 of the mobile robot according to the exemplary embodiment of the present invention lies in that the gear box 110 is rotated by elastic force of the pulling member 130 in a direction in which the wheel 120 is moved down, and the elastic force of the pulling member 130 is continuously applied to the wheel 120 so that the wheel 120 is moved down. That is, the gear box 110 is rotated about the rotation shaft 112 by elastic force of the pulling member 130 such that force, which moves the wheel 120 down in a direction toward the running surface, is applied to the wheel 120. Therefore, a state in which the wheel 120 is pressed against the running surface side by elastic force of the pulling member 130 is maintained even in a state in which the wheel 120 is in contact with the running surface, and thereby, contact force of the wheel 120 is increased. When the mobile robot is placed on the running surface in a state in which the wheel assembly 100 is mounted on the robot body 200, the wheel 120 comes into contact with the running surface, and in this case, since a weight of the mobile robot is applied to the wheel 120 such that moment, which is formed on the gear box 110, is greater than moment which occurs by elastic force of the pulling member 130, the wheel 120 is moved up and inserted into the robot body 200 side as illustrated in FIGS. 6 and 8. In contrast, in a case in which the mobile robot floats in the air, or the bottom surface 210 of the mobile robot is moved up from the running surface by an obstacle such as a threshold, the wheel 120 is moved down by the amount by which the bottom surface 210 of the mobile robot is moved up from the running surface, and withdrawn from the robot body 200 as illustrated in FIGS. 7 and 9. Since the wheel assemblies 100 provided in the mobile robot have the wheels 120 which are moved up and down independently, one wheel 120a may be withdrawn from the robot body 200, and the other wheel 120b may be inserted into the robot body 200, as illustrated in FIG. 10. Therefore, even though one wheel 120 is more depressed than the other wheel so as to be positioned on a running surface having a concave shape when the mobile robot runs, the corresponding wheel 120 is moved down toward the running surface side of the concave shape and then comes into contact with the running surface, and as a result, the mobile robot may run in a desired direction.

Meanwhile, when the mobile robot passes over an obstacle 300 such as a threshold, the mobile robot normally runs as illustrated in FIG. 11A, and then the bottom surface 210 of the mobile robot is moved up from the running surface by the obstacle 300 as illustrated in FIG. 11B. At the same time when the bottom surface 210 of the mobile robot is moved up from the running surface, each of the wheels 120 is withdrawn from the robot body 200 and maintained in a state in which the wheel 120 is in continuous contact with the running surface. As illustrated in FIG. 11C, when the mobile robot continuously runs by driving power of the wheel 120, and the wheel 120 reaches an upper surface of the obstacle 300, the wheel 120 is inserted again into the robot body 200 by a weight of the mobile robot such that the bottom surface 210 of the mobile robot is moved down. Thereafter, the mobile robot continuously runs so as to pass over the obstacle.

In addition, the pulling member 130 acts as resistance when the wheel 120 is inserted into the robot body 200, and as a result, when the mobile robot moves on a running surface where a floor is uneven, or passes over an obstacle such as a threshold, impact, which occurs at the wheel 120, is attenuated by the pulling member 130. Therefore, even though impact occurs at the wheel 120 when the mobile robot moves, the impact is attenuated or completely eliminated by the pulling member 130, thereby preventing damage or malfunction of various types of components that are mounted in the mobile robot.

Although an exemplary embodiment of the present invention has been described for illustrative purposes, those skilled in the art will appreciate that various modifications, changes and substitutions are possible, without departing from the scope and spirit of the invention. Accordingly, the exemplary embodiment disclosed in the present invention is not intended to limit but illustrate the technical spirit of the present invention, and the scope of the technical spirit of the present invention is not limited by the exemplary embodiment. The protection scope of the present invention should be construed based on the following appended claims and it should be appreciated that the technical spirit included within the scope equivalent to the claims belongs to the present invention.

The invention claimed is:

1. A wheel assembly of a mobile robot, comprising:
   a gear box which accommodates a driving gear driven by a driving motor and a driven gear driven by the driving gear, installed to be rotatable about a rotation shaft in front and rear directions with respect to a robot body and having a first fixing part, the rotating shaft being provided at one side of the gear box;
   a wheel which is coupled to a rotary shaft of the driven gear so as to rotate integrally with the driven gear, and move up or down with respect to the robot body when the gear box is rotates; and
   a pulling member which has one end fixed to the first fixing part and the other end fixed to a second fixing part which is fixed with respect to the robot body, and pulls the first fixing part toward the second fixing part so as to rotate the gear box in a direction to move the wheel down with respect to the robot body.

2. The wheel assembly of claim 1, wherein the pulling member is a coil spring.

3. The wheel assembly of claim 1, wherein the pulling member is a flat spring.

4. The wheel assembly of claim 1, wherein at least a part of an outer circumferential surface of the rotation shaft is circular, and the rotation shaft is seated on and supported by a rotation shaft seating portion having a shape that matches a shape of the outer circumferential surface of the rotation shaft.

5. The wheel assembly of claim 4, further comprising:
   a lower case which accommodates at least a part of the gear box and at least a part of the wheel, the lower case including an opened upper portion and a lower surface, and being coupled and fixed to the robot body, the lower surface including an opened portion through which the wheel moves up and down,
   wherein the lower case further includes the rotation shaft seating portion.

6. The wheel assembly of claim 5, wherein the lower case further includes the second fixing part.

7. The wheel assembly of claim 6, further comprising:
   an upper case coupled to an upper portion of the lower case, and accommodating at least a part of the gear box and at least a part of the wheel.

8. The wheel assembly of claim 7, wherein the upper case includes a rotation shaft cover which is provided over the rotation shaft seating portion such that the rotation shaft is interposed between the rotation shaft cover and the rotation shaft seating portion so as to prevent the rotation shaft from being moved away from the rotation shaft seating portion.

9. The wheel assembly of claim 1, wherein the rotation shaft is hinge-coupled.

10. The wheel assembly of claim 9, further comprising:
a lower case which accommodates at least a part of the gear box and at least a part of the wheel, the lower case including an opened upper portion and of lower surface and being coupled and fixed to the robot body, the lower surface including an opened portion through which the wheel moves up and down,
wherein the rotation shaft is hinge-coupled to the lower case.

11. The wheel assembly of claim 1, further comprising a sensor which is a contact sensor and comes into contact with a protruding portion,
wherein the protruding portion, which is provided on a surface of the gear box, extends in a direction perpendicular to the surface of the gear box.

12. The wheel assembly of claim 11, wherein the sensor is a micro switch, and is inserted into a sensor fixing part that is provided at a lower case.

* * * * *